(12) United States Patent
Patel et al.

(10) Patent No.: US 9,124,644 B2
(45) Date of Patent: Sep. 1, 2015

(54) SCRIPT-CONTROLLED EGRESS PACKET MODIFIER

(71) Applicant: Netronome Systems, Inc., Santa Clara, CA (US)

(72) Inventors: Chirag P. Patel, Nashua, NH (US); Gavin J. Stark, Cambridge (GB)

(73) Assignee: NETRONOME SYSTEMS, INC., Santa Clara, CA (US)

( * ) Notice: Subject to any disclaimer, the term of this patent is extended or adjusted under 35 U.S.C. 154(b) by 165 days.

(21) Appl. No.: 13/941,494

(22) Filed: Jul. 14, 2013

(65) Prior Publication Data

US 2015/0016458 A1 Jan. 15, 2015

(51) Int. Cl.
*H04L 29/06* (2006.01)
*G06F 9/00* (2006.01)

(52) U.S. Cl.
CPC . *H04L 69/22* (2013.01); *G06F 9/00* (2013.01)

(58) Field of Classification Search
CPC ..... H04L 69/22; H04L 45/00; G06F 9/30018; H04Q 11/0478
See application file for complete search history.

(56) References Cited

U.S. PATENT DOCUMENTS

| 6,061,783 | A  | * | 5/2000  | Harriman .................. 712/224 |
|-----------|----|---|---------|-------------------------------------|
| 7,424,019 | B1 | * | 9/2008  | Kopelman et al. .......... 370/392   |
| 7,463,628 | B2 | * | 12/2008 | Parker et al. ............... 370/392 |
| 7,606,263 | B1 | * | 10/2009 | Parker ........................ 370/474 |
| 2004/0003110 | A1 | * | 1/2004 | Ozguner .................... 709/236  |
| 2005/0071827 | A1 | * | 3/2005 | Lai ............................ 717/146 |

* cited by examiner

*Primary Examiner* — Jung Park
*Assistant Examiner* — Chuong M Nguyen
(74) *Attorney, Agent, or Firm* — Imperium Patent Works; Mark D. Marrello; T. Lester Wallace

(57) ABSTRACT

An egress packet modifier includes a script parser and a pipeline of processing stages. Rather than performing egress modifications using a processor that fetches and decodes and executes instructions in a classic processor fashion, and rather than storing a packet in memory and reading it out and modifying it and writing it back, the packet modifier pipeline processes the packet by passing parts of the packet through the pipeline. A processor identifies particular egress modifications to be performed by placing a script code at the beginning of the packet. The script parser then uses the code to identify a specific script of opcodes, where each opcode defines a modification. As a part passes through a stage, the stage can carry out the modification of such an opcode. As realized using current semiconductor fabrication process, the packet modifier can modify 200M packets/second at a sustained rate of up to 100 gigabits/second.

19 Claims, 9 Drawing Sheets

SCRIPT-BASED AND PIPELINED EGRESS PACKET MODIFIER

STRUCTURE OF A SCRIPT CODE

STRUCTURE OF A SCRIPT

STRUCTURE OF AN OPCODE

NETWORK APPLIANCE

ME ISLAND

NBI ISLAND
(EGRESS)

MAC ISLAND
(EGRESS)

SCRIPT-CONTROLLED EGRESS PACKET MODIFIER

TECHNICAL FIELD

The described embodiments relate generally to egress packet modification.

BACKGROUND INFORMATION

Egress packet modification conventionally involves a packet stored in a memory. A processor that is executing software or firmware instructions accesses the packet in memory, and modifies the packet. Typically part of the packet or all of the packet is read from memory, is analyzed, and is then written back into the memory in modified form. Some modifications involve the inserting of bits into the packet. In such a case, a second part of the packet may be read out of memory and then written back such that there exists a space in memory between the second part of the packet and a first part of the packet. The bits to be inserted are then written into the memory into memory locations between where the first part and the second part are stored. Other modifications involve the replacement of parts of the packet, or the incrementing or the decrementing of values in certain fields of the packet. To carry out such a modification, the processor executing the software or firmware fetches instructions from a code memory, decodes the instructions, and then executes the instructions. Execution of the instructions causes the desired modifications to take place. Part of the packet is read out of memory, and is then written back into memory. At the end of the egress modification process, the modified packet exists in the memory. As higher and higher packet throughputs and output bit rates are required, multiple such processors are brought to bear in performing the necessary modifications. The resulting modified packets in memory are then read out of the memory and are supplied to egress MAC functionality. From the egress MAC functionality the packets are communicated across a physical interface.

SUMMARY

An egress packet modifier includes a script parser and a pipeline of processing stages. A packet is to be modified on its way out ("egress") of a network appliance. In order to carry out this modification, an originating and controlling processor attaches a "script code" to the beginning of a packet. In one example, the processor sets up a script by storing a set of instructions in a memory, and by storing a set of arguments in a memory. Later, when the packet is scheduled for output from the network appliance, the packet is supplied to the egress packet modifier from a packet supplying memory. The packet is supplied in parts. A part (also referred to as a chunk) of a packet may, for example, be thirty-two bytes. The first part of the packet includes the script code that was previously prepended by the processor. The egress packet modifier receives the first part of the packet from the packet supplying memory, and uses a first address pointer in the script code to retrieve an indicated set of instructions from the instruction memory, and uses a second address pointer in the script code to retrieve an indicated set of arguments from the argument memory. Each instruction has an associated value that indicates a number of bytes to modify in carrying out a modification as indicated by the instruction. From the retrieved instructions, the retrieved arguments, and from a set of offsets received as parts of the script code itself, the script parser generates a corresponding set of opcodes. The set of opcodes is referred to as a script. In one example, each opcode includes an instruction, an associated offset, a number of bytes to modify, and an associated argument.

All the opcodes of the script are supplied at the same time to the first stage of the pipeline along with the first part of the packet. The first stage performs any of the operations (indicated by the opcodes) on the first part of the packet that it can perform. Next, the modified first part of the packet is passed from the first stage the second stage, and the first stage receives the second part of the packet from the packet supplying memory. The first stage also passes on to the second stage only those opcodes that remain to be performed. In a second cycle, the first stage performs any of the operations (indicated by the remaining opcodes) on the second part of the packet that it can perform, and the second stage performs any of the operations (indicated by the opcodes it receives from the first stage) on the first part of the packet that it can perform. Next, the modified first part of the packet is passed from the second stage to the third stage, and the modified second part of the packet is passed from the first stage to the second stage, and the third part of the packet is supplied by the packet supplying memory to the first stage. Each stage receives opcodes from the prior stage of the pipeline, and if the stage performs one of the operations indicated by an opcode, then the stage passes the remaining opcodes for operations it has not performed on to the next stage of the pipeline. Each part of the packet passes from stage to stage through the pipeline. In some embodiments it is possible that the later stages of the pipeline can be modifying end parts of an earlier packet at the same time that the first stages of the pipeline are modifying the beginning parts of a later packet.

In one example, the modifications that a stage can perform (as instructed by an opcode) include: 1) a delete modification (delete a portion of the part of the packet), 2) an insert modification (insert bits into the part of the packet), 3) a replace modification (replace some of the bits of the part of the packet with other bits), 4) an increment modification (increment a value that is carried in part of the packet), 5) a decrement modification (decrement a value that is carried in part of the packet), and 6) a pad modification (to add zero bits to the end of a part of the packet).

The stages are not software-executing processors, but rather are registered high-speed combinatorial logic circuits. Each modification is done in a single clock cycle of a one gigahertz clock signal. None of the stages of the pipeline fetches instructions, decodes the instructions, and executes the instructions. None of the stages reads any part of a packet out of a memory, performs a modification, and writes the part back into a memory.

In one example, the first bit of the script code indicates whether the script is a direct script or an indirect script. An indirect script is as described above where the script parser reads a set of instructions and a set of arguments from another memory, in order to obtain the necessary instructions and arguments to form a set of opcodes. A direct script, on the other hand, requires no retrieval of instructions or arguments from another memory in order to form a set of opcodes. The script code itself contains the complete set of opcodes. The set of opcodes from the script code is simply supplied to the first stage of the pipeline to start the pipeline operating.

As a part of the packet passes through the pipeline and is modified, the part can increase in size and can decrease in size. As modified parts of the packet are output from the pipeline, they are assembled into a larger chunk by an assembler circuit. In one example, each such larger chunk is called a "minipacket" and includes a header of out-of-band control information, where the out-of-band control information indicates how the data portion of the minipacket can be combined with the data portions of other minipackets to reform the overall modified packet. There may be multiple such minipackets that together carry the modified packet. The modified packet is supplied in the form of a stream of these minipackets to an egress MAC processing circuit. From the egress MAC processing circuit, the modified packet passes in one example through a SerDes, and possibly through an optical transceiver, and then across a physical layer communication medium.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
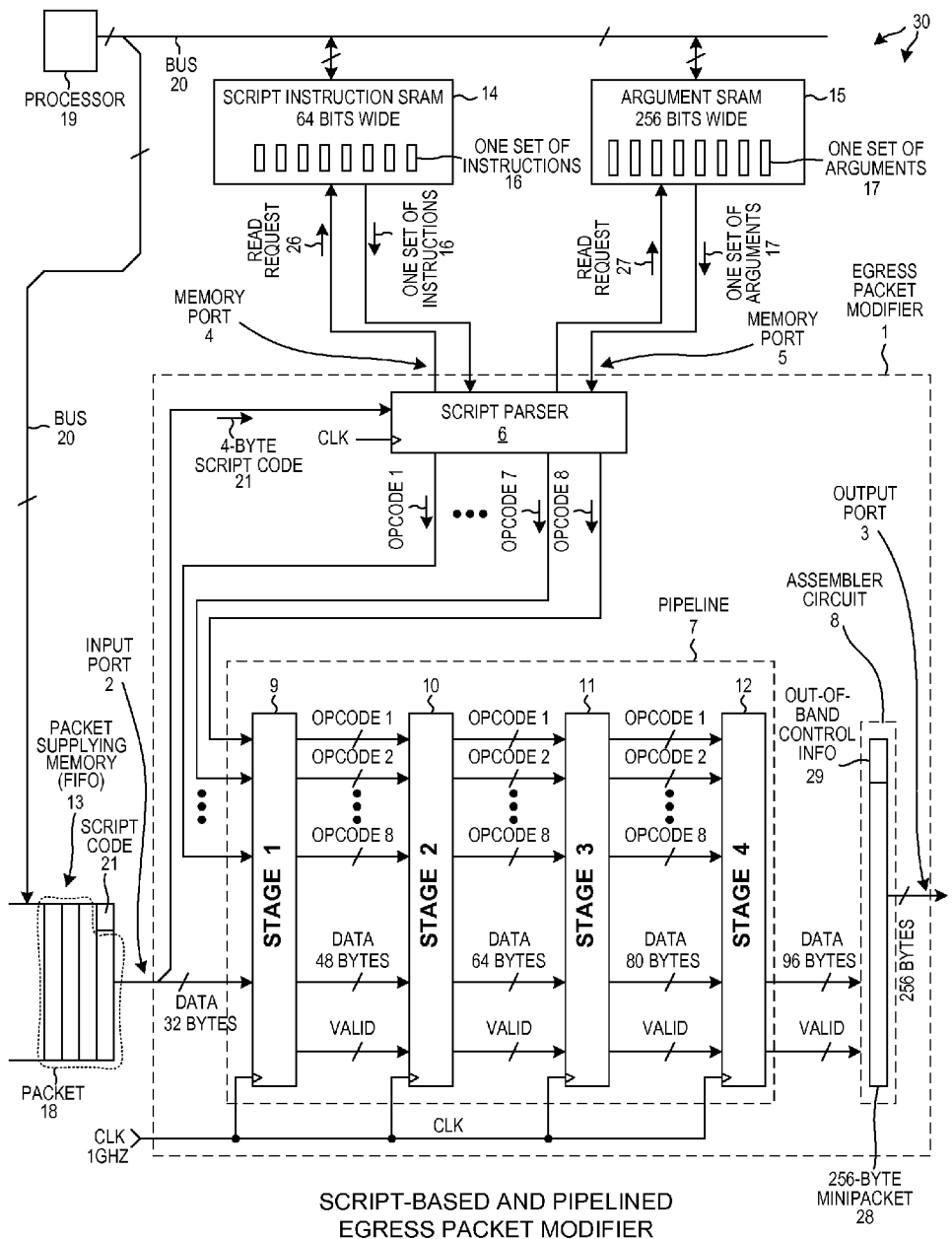
FIG. 1 is a diagram of a system 30 involving a script-based and pipelined egress packet modifier 1 in accordance with one novel aspect.

FIG. 1 is a diagram of system 30 involving a script-controlled and pipelined egress packet modifier 1. Egress packet modifier 1 includes a packet input port 2, a packet output port 3, a first memory interface port 4, a second memory interface port 5, a script parser 6, a pipeline 7, and an assembler circuit 8. The pipeline 7 includes four processing stages 9-12. In addition to egress packet modifier 1, the system 30 includes a packet supplying memory 13, a script instruction SRAM 14, an argument SRAM 15, a processor 19, and a bus 20. Numerous sets of pipeline stage instructions are stored in the script instruction SRAM. In this example, each set includes eight instructions. Along with each instruction is a value that indicates how many bytes to modify. Reference numeral 16 identifies one such set of instructions. Numerous sets of arguments are stored in the argument SRAM. In this example, each set include eight arguments. Reference numeral 17 identifies one such set of arguments. In the presently described example, processor 19 causes a packet 18 to be written into packet supplying memory 13 across bus 20. Processor 19 also preloads the sets of instructions and sets of arguments into SRAMs 14 and 15.

Information can be written into packet supplying memory 13 in wide words or in more numerous writes of smaller chunks of data, but information is supplied from the packet supplying memory 13 to the egress packet manager 1 in 32-byte chunks. Packet supplying memory 13 is implemented as a FIFO (First In First Out) memory. The packet 18 is larger than thirty-two bytes, so that packet is stored in memory as an ordered set of 32-byte words.

The first 32-byte word of the packet 18 contains the beginning of the packet, and before the beginning of the first packet header is a 4-byte script code 21. The script code 21 was generated by processor 19. By adding the appropriate script code to the front of a packet, the processor 19 determines the type of egress processing that will later be performed on the packet by the egress packet modifier.

At the proper time as determined by a scheduler, packets are loaded into the packet supplying memory 13. The first thirty-two bytes of the packet is then read out of the packet supplying memory 13 and is supplied to the egress packet modifier 1. The script code 21 from this first thirty-two bytes is passed to the script parser 6.

Figure 2:
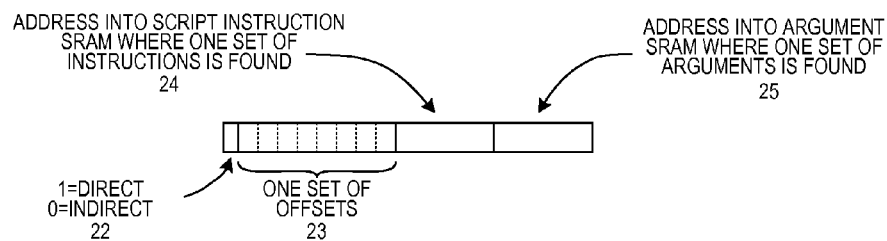
FIG. 2 is a diagram that illustrates the structure of a script code used by the script-based and pipelined egress packet modifier of FIG. 1.

FIG. 2 is a diagram that illustrates the various components of a script code. Script code 6 includes a starting direct/indirect bit 22, one set of eight offsets 23, an address 24 into the script SRAM where one set of instructions is found, and an address 25 into the argument SRAM where on set of arguments is found. The direct/indirect bit being set indicates that the pipeline can perform modifications without anything being read from SRAMs 14 and 15. Any necessary instructions and arguments for the modification are carried as part of the script code or at the beginning of the packet between the script code and the beginning of the first packet header. The direct/indirect bit being cleared indicates that the SRAMs 14 and 15 are to be read to obtain instructions and arguments for carrying out the modifications to be performed.

In the presently described example, the direct/indirect bit is cleared so the script is an indirect script. Script parser 6 therefore issues a read request 26 to the script instruction SRAM 14 via first memory port 4. The starting address of the read is given by the first address 24 of the script code. In addition, script parser 6 issues a read request 27 to argument SRAM 15 via second memory port 5. The starting address of the read is given by the second address 25 of the script code. It may take several clock cycles for the SRAMs to retrieve the stored information, and for the read transactions to be completed. During this time, the remainder of the first thirty-two bytes of the first chuck of the packet is not passed through the pipeline 7, but rather the data is held in a buffer (not shown). Eventually, the set of instructions 16 pointed to by the first address 24 of the script code 21 is returned by SRAM 14 to script parser 6 via first memory port 4, and the set of arguments 17 pointed to by the second address 25 of the script code 21 is returned by SRAM 15 to script parser 6 via second memory port 5. Along with each instruction is a value that indicates a corresponding number of bytes to be modified when the modification of the instruction is carried out. The script parser 6 uses the retrieved set of eight instructions and the retrieved set of eight arguments and the associated set of eight offsets to form a corresponding script 26 of eight opcodes. The opcodes in this example are denoted OPCODE 1, OPCODE 2, and so forth.

Figure 3:
FIG. 3 is a diagram of a script used by script-based and pipelined egress packet modifier of FIG. 1.

FIG. 3 is a diagram that illustrates the structure of script 26.

Figure 4:
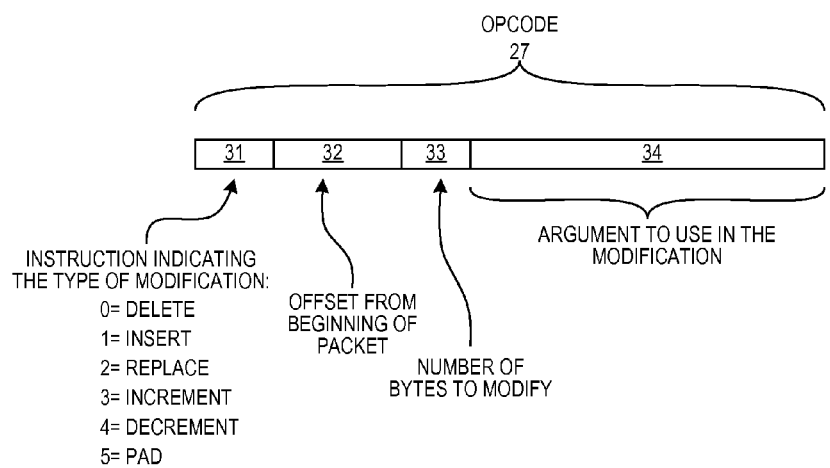
FIG. 4 is a diagram that illustrates the structure of an opcode.

FIG. 4 is a diagram that illustrates the structure of an opcode 27. All the opcodes are of identical composition and include an instruction, an offset, a value indicating a number of bytes of modify, and an argument. Accordingly, opcode #1 27 includes instruction 31, an offset 32, a value indicating a number of bytes of modify 33, and an argument 34, where the instruction is the first instruction of the set of instructions read from SRAM 14, where the offset is the first offset in the script code, where the number of bytes to modify is the value read from SRAM 14 along with the first instruction, and where the argument is the first argument of the set of arguments read from SRAM 15. Each of the eight opcodes is formed by script parser 6 in this manner.

As shown in FIG. 1, the resulting eight opcodes (OPCODE 1 through OPCODE 8) are supplied simultaneously in parallel to the first stage 9 of the pipeline 7. At this time, the first thirty-two bytes of the first chunk is also supplied to the first stage 9 of the pipeline 7. Each opcode is an instruction to perform a modification, starting at a certain offset from the beginning of the packet. Each stage maintains a byte count value that is used to keep track of what the byte count is (measured from the beginning of the packet) of the first byte of the chunk that the stage is currently processing.

It is possible that several of the opcodes indicate that their modifications should be performed on the same 32-byte chunk. If this is the case, then the first stage will perform one of the modifications, and will pass the opcodes for the remaining opcodes on to the second stage of the pipeline so that the next stage in the pipeline can do the modification. The opcode of the modification that is actually performed by the first stage is not passed on by the first stage to the second stage, but rather a NoOP (no operation) will be passed on in its place. The stage is therefore said to "consume" opcodes. If the first stage can perform multiple modifications in one clock cycle, it will.

After the first clock cycle, the modified data contents of the first stage 9 is passed on to the second stage 10, and the second thirty-two bytes of the packet is supplied via input port 2 into the first stage 9. During this second clock cycle, the first stage 9 can consider performing any modifications that are indicated by the opcodes to be modifications to be performed on the second thirty-two byte chunk of the packet. During this same second clock cycle, the second stage 10 considers performing any modification indicated by the opcode or opcodes passed to it by the first stage. If the second stage has an opcode that indicates a modification should be performed on the first thirty-two byte chunk, then the second stage 10 will perform the modification if it can. As described above in connection with the first stage, the second stage may perform multiple modifications on the second thirty-two byte chunk if it is able. The opcode of any modification performed by the second stage is not passed by the second stage on to the third stage 11, but rather a NoOP is passed on in its place. Any opcodes that the second stage 10 received that it did not perform are passed on to the third stage 11.

In the third clock cycle, the third stage considers performing modifications on the first chunk of the packet, the second stage considers performing modifications on the second chunk of the packet, and the first stage considers performing modifications on the third chunk of the packet. The pipeline process continues in this fashion, with such successive thirty-byte chunks of the packet being passed through the pipeline. If a stage performs a modification as indicated by an opcode, then that stage does not pass the opcode on to the next stage.

It is possible that a modification may result in the size of the chunk (size in number of bits) increasing to be larger than thirty-two bytes, or may result in the size of the chunk decreasing to be smaller than thirty-two bytes. The description above of each chunk of the packet being thirty-two bytes was a simplification—in actuality the chunks may increase and decrease in size as they pass through the stages of the modifier. The "delete" instruction, for example, results in bits of the chunk being deleted starting at the indicated offset, where the number of bytes to delete is indicated in the number of bytes to modify field of the opcode. The "insert" instruction, for example, results in bits being added to the chunk starting at the indicated offset, wherein the number of bytes to insert is indicated in the number of bytes of modify field of the opcode. Accordingly, the size of the chunk passing from stage to stage is indicated by a "valid" value. A stage can add at most sixteen bytes, so there are data lines for receiving thirty-two bytes (256 data lines) coming into the first stage, and there are data lines for supplying forty-eight bytes (384 data lines) going out of the first stage. Which ones of these lines carry valid data out of the first stage is indicated by the valid value passed from the first stage to the second stage. If the first stage inserted bits, then more than thirty-two worth of data lines going out of the first stage will carry data, and the number of these lines that carry valid data will be indicated by the valid value. If the first stage deleted bits, then fewer than thirty-two worth of data lines going out of the first stage will carry data, and the number of these lines that carry value data will be indicated by the valid value.

In a similar fashion, it is possible that the second stage will receive forty-eight bytes worth of data, and will also perform an insert operation of up to sixteen bytes, so that the second stage is to output sixty-four bytes worth of data. Notice in FIG. 1 that there are sixty-four bytes worth (512 data lines) of data lines extending from the second stage to the third stage. The number of these lines that carry data is indicated by the valid value passed by the second stage to the third stage.

As chunks of data pass out of the fourth stage 12, the bits of the packet (that are indicated as valid) are assembled and are packed together in order by assembler circuit 8 to form larger 256-byte chunks of data. Such a larger chunk of data is referred to here as a "minipacket". Each minipacket includes a preceding "out-of-band control information" header portion that indicates how the data of the minipacket is to be assembled with data of other minipackets to form the overall packet 18. In the illustration of FIG. 1, minipacket 28 includes out-of-band control information 29. Once assembled, the minipacket 28 is output from the egress packet modifier 1 in parallel via output port 3. The 256-byte minipackets are supplied directly and in parallel across dedicated conductors to an egress MAC (Media Access Control) circuit (not shown). If the egress MAC processing circuit is not ready to receive additional minipackets, then a flow control mechanism detects the backpressure and stalls the egress packet modifier pipeline.

The egress MAC processing circuit performs egress MAC layer processing. For example, the egress MAC processing circuit typically recalculates checksums on individual headers within the packet. This recalculating is generally necessary due to the packet having been modified. In addition, the egress MAC processing circuit may calculate an overall SCS security value over the entire packet and may append the SCS security value to the end of the packet in standard fashion. In addition, if the packet is not already in ethernet format, the egress MAC processing circuit puts the packet into ethernet format. In such a case, the egress MAC processing circuit may generate and attach the appropriate ethernet addresses and headers. The egress MAC processing circuit converts the packet into symbols. After egress MAC processing, the resulting symbols are communicated via a SerDes circuit and an associated physical layer circuit. Physical layer communication may, for example, be across metal conductors of a backplane to another line card, or across network cables to another network appliance.

Egress packet modifier 1 is script-based in the sense that a script of opcodes is set up beforehand by processor 19. Processor 19 places a script code 21 on the front of the packet, where the script code indicates a particular script which when carried out by the egress packet modifier results in a specific modification. In this way, processor 19 can select the particular egress modification to be performed on a particular packet by appending an appropriation script code onto the front of the packet at the time of packet processing. When the packet is then later scheduled for egress, the egress packet modifier reads the script code from the front of the packet and uses the script code to perform the egress modification as previously set up by processor 19. As the network appliance operates, the processor 19 can add scripts to, and can remove scripts from, the script instruction SRAM 14. Likewise, as the network appliance operates, the processor 19 can add arguments to, and can remove arguments from, argument SRAM 15.

Example: In one particular example of a script, opcode 1 includes a replace instruction and the argument is an ethernet source address, and the offset indicates byte six which is the beginning of the 6-byte ethernet source address of the packet, and the number of bytes to modify is six. Opcode 1 therefore results in a replacement of the 6-byte ethernet source address at bytes six through twelve with the associated 6-byte ethernet source address stored in argument SRAM 15.

Opcode 2 includes a similar replace instruction, but the argument is an ethernet destination address. The offset value of twelve indicates the beginning of the 6-byte ethernet destination address of the packet starting at byte twelve. The number of bytes to modify is six. Opcode 2 therefore results in a replacement of the 6-byte ethernet destination address (packet bytes twelve through eighteen) with the 6-byte ethernet destination address stored in argument SRAM 15.

Opcode 3 includes an insert instruction and the argument is a 4-byte MPLS label, and the offset indicates byte thirty-two of the packet, and the number of bytes to modify is four. Opcode 3 therefore results in the 4-byte MPLS label being inserted into the packet starting at byte 32 after the ethernet header.

Opcode 4 includes a decrement instruction and the offset indicates the beginning of the 1-byte TTL (Time To Live) field of the MPLS pushed label, where the byte to decrement is identified by offset thirty-six. Opcode 4 results in the TTL value of the packet being decremented.

Opcodes 5 through 8 may be NoOps.

The example described above involves an indirect script where the instructions and the arguments are stored in SRAMs 14 and 15. In the case of a direct script, the string of opcodes is included after the direct/indirect bit, and before the beginning of the actual packet. There are many other ways that the necessary information for the creation of the opcodes can be supplied to the egress packet modifier 1. In each case, however, the resulting opcodes are supplied to the first stage 9.

Figure 5:
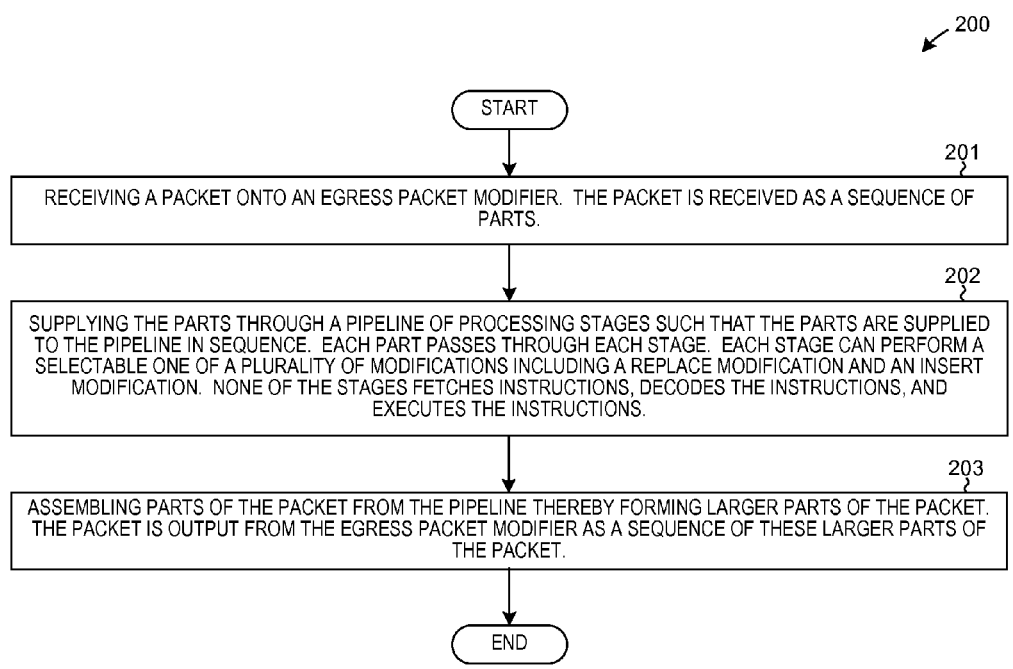
FIG. 5 is a flowchart of a method 200 of operation of a pipelined egress packet modifier in accordance with one novel aspect.

FIG. 5 is a flowchart of the method 200 in accordance with one novel aspect. A packet is received (step 201) onto an egress packet modifier. The packet is received as a sequence of parts. The parts (also referred to as chunks) are supplied (step 202) through a pipeline of processing stages of the pipeline such that the parts are supplied to the pipeline in sequence. Each part passes through each stage. Each stage can perform a selectable one of a plurality of modifications on the part. In one example, the selectable modifications include: a delete modification, an insert modification, a replace modification, an increment modification, a decrement modification, and a pad modification. None of the stages fetches instructions, decodes the instructions, and executes the instructions. The modified parts of the packet as output from the pipeline are assembled (step 203) into larger parts of the packet. The resulting modified packet is output from the egress packet modifier as a sequence of these larger parts. In one example, the larger parts are referred to as minipackets. There may only be one larger part that is actually the entire packet.

Figure 6:
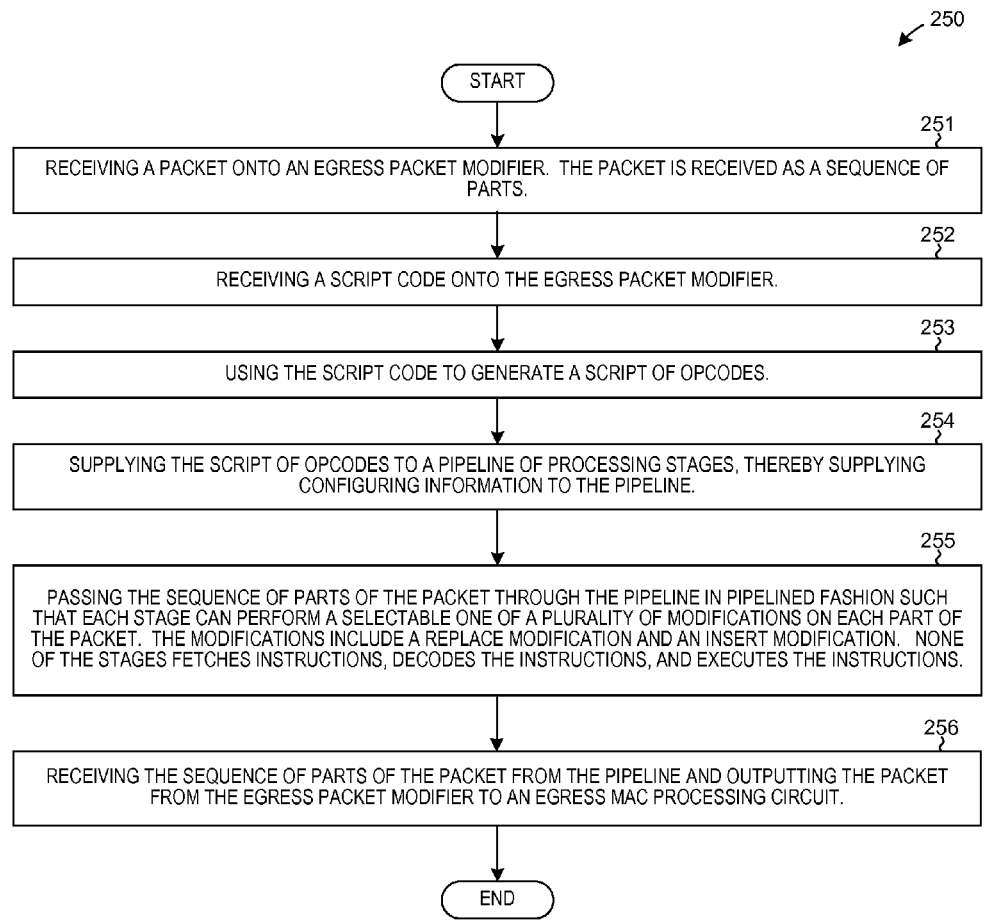
FIG. 6 is a flowchart of a method 250 of operation of a script-based egress packet modifier in accordance with one novel aspect.

FIG. 6 is a flowchart of a method 250 in accordance with one novel aspect. A packet is received (step 251) onto an egress packet modifier. The packet is received as a sequence of parts (also referred to as chunks). A script code is received (step 252) onto the egress packet modifier. The script code is used (step 253) to generate a plurality of opcodes. The opcodes are supplied (step 254) to a pipeline of processing stages. The opcodes are used over time by the pipeline to configure the various stages of perform modifications at the correct times, and on the correct packet parts. The sequence of parts of the packet are passed (step 255) through the pipeline such that each stage can perform a selectable one of a plurality of modifications on each part of the packet. In one example, the selectable modifications include: a delete modification, an insert modification, a replace modification, an increment modification, a decrement modification, and a pad modification. None of the stages fetches instructions, decodes the instructions, and executes the instructions. The sequence of modified parts are received (step 256) from the pipeline and are output from the egress packet modifier as a modified packet to an egress MAC processing circuit.

Specific Example in a Network Appliance

Figure 7:
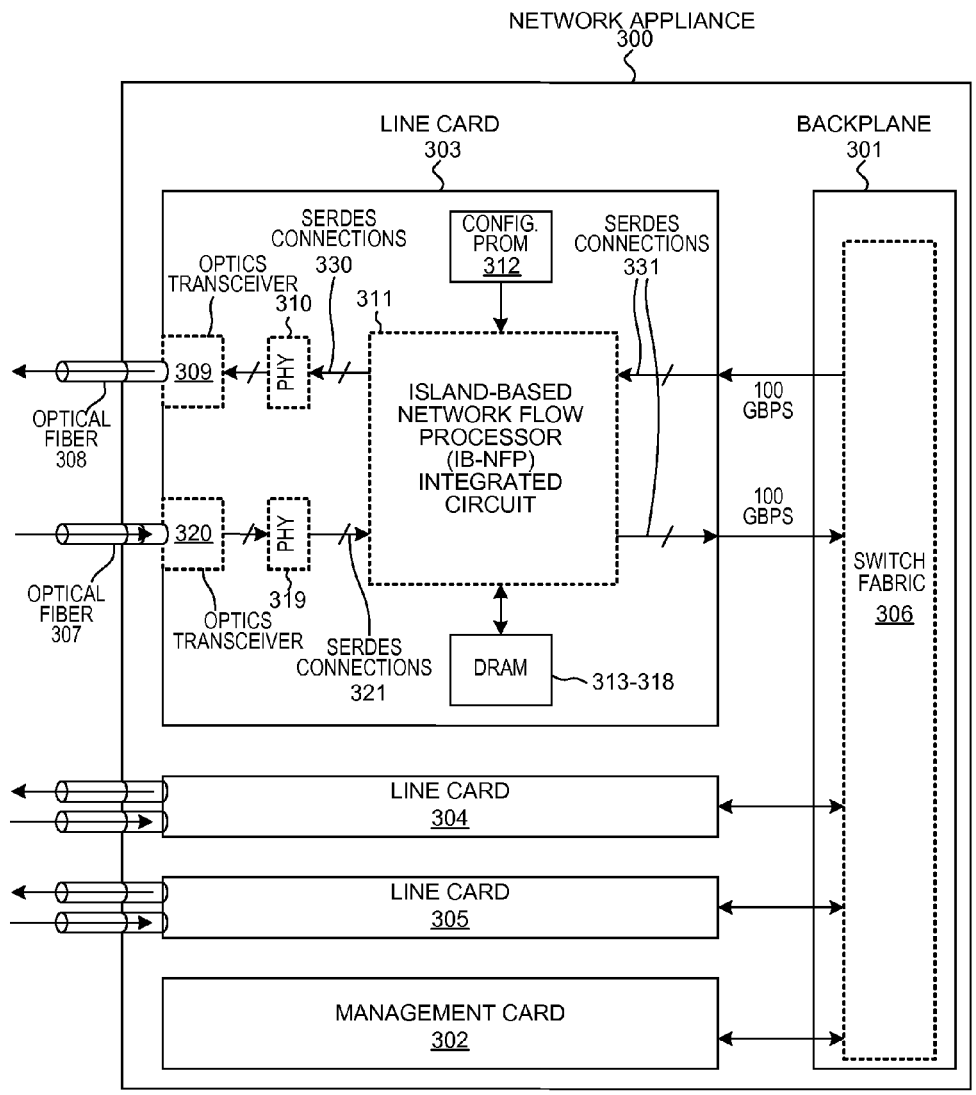
FIG. 7 is a diagram of a network appliance 300 within which a specific embodiment of the script-based and pipelined egress packet modifier operates.

FIG. 7 is a diagram of a network appliance 300 within which a specific embodiment of the script-based and pipelined egress packet modifier operates. The egress packet modifier is described generally in connection with FIG. 1, whereas a specific example of the egress packet modifier is described in connection with network appliance 300.

Network appliance 300 includes a backplane 301, a management card 302, and line cards 303-305. Each of the line cards can receive 100 Gbps (gigabits per second) packet traffic from another network via a fiber optic cable and also can transmit 100 Gbps packet traffic to another network via another fiber optic cable. In addition, each line card can receive 100 Gbps packet traffic from the switch fabric 306 of the backplane and can also transmit 100 Gbps packet traffic to the switch fabric. The line cards are of identical construction. In this example, flows of packets are received into line card 303 from a network via the fiber optic cable 307 or from the switch fabric 306. Certain functions then need to be performed on the line card including determining destinations for incoming flows of packets, and scheduling the transmitting of flows of packets. Packets of the flows pass from the line card 303 and out either to the network via optical cable 308 or to the switch fabric 306.

Exemplary line card 303 includes a first optical transceiver 309, a first PHY integrated circuit 310, an Island-Based Network Flow Processor (IB-NFP) integrated circuit 311, a configuration Programmable Read Only Memory (PROM) 312, an external memory such as Dynamic Random Access Memory (DRAM) 313-318, a second PHY integrated circuit 319, and a second optical transceiver 320. Packet data received from the network via optical cable 307 is converted into electrical signals by optical transceiver 320. PHY integrated circuit 319 receives the packet data in electrical form from optical transceiver 320 and forwards the packet data to the IB-NFP integrated circuit 311 via SerDes connections 321. In one example, the flows of packets into the IB-NFP integrated circuit 311 from optical cable 307 is 100 Gbps traffic. A set of four SerDes circuits 322-325 (see FIG. 8) within the IB-NFP integrated circuit 311 receives the packet data in serialized form from SerDes connections 321, deserializes the packet data, and outputs packet data in deserialized form to digital circuitry within IB-NFP integrated circuit 311.

Similarly, IB-NFP integrated circuit 311 may output 100 Gbps packet traffic to optical cable 308. PHY 310 receives the serialized form packet data via SerDes connections 330 and supplies the packet data to optical transceiver 309. Optical transceiver 309 converts the packet data into optical form and drives the optical signals through optical cable 308.

IB-NFP integrated circuit 311 can also output packet data to switch fabric 306. Another set of four duplex SerDes circuits 326-329 within IB-NFP integrated circuit 311 receives the packet data in deserialized form, and serializes the packet data, and supplies the packet data in serialized form to switch fabric 306. Packet data from switch fabric 306 in serialized form can pass from the switch fabric via SerDes connections 331 into the IB-NFP integrated circuit 311 and to the set of four SerDes circuits 326-329. SerDes circuits 326-329 convert the packet data from serialized form into deserialized form for subsequent processing by digital circuitry within the IB-NFP integrated circuit 311.

Management card 302 handles appliance management functions including the configuring of the IB-NFP integrated circuits on the various line cards. The CPU of the management card communicates with the IB-NFP integrated circuits via dedicated PCIE connections (not shown).

Figure 8:
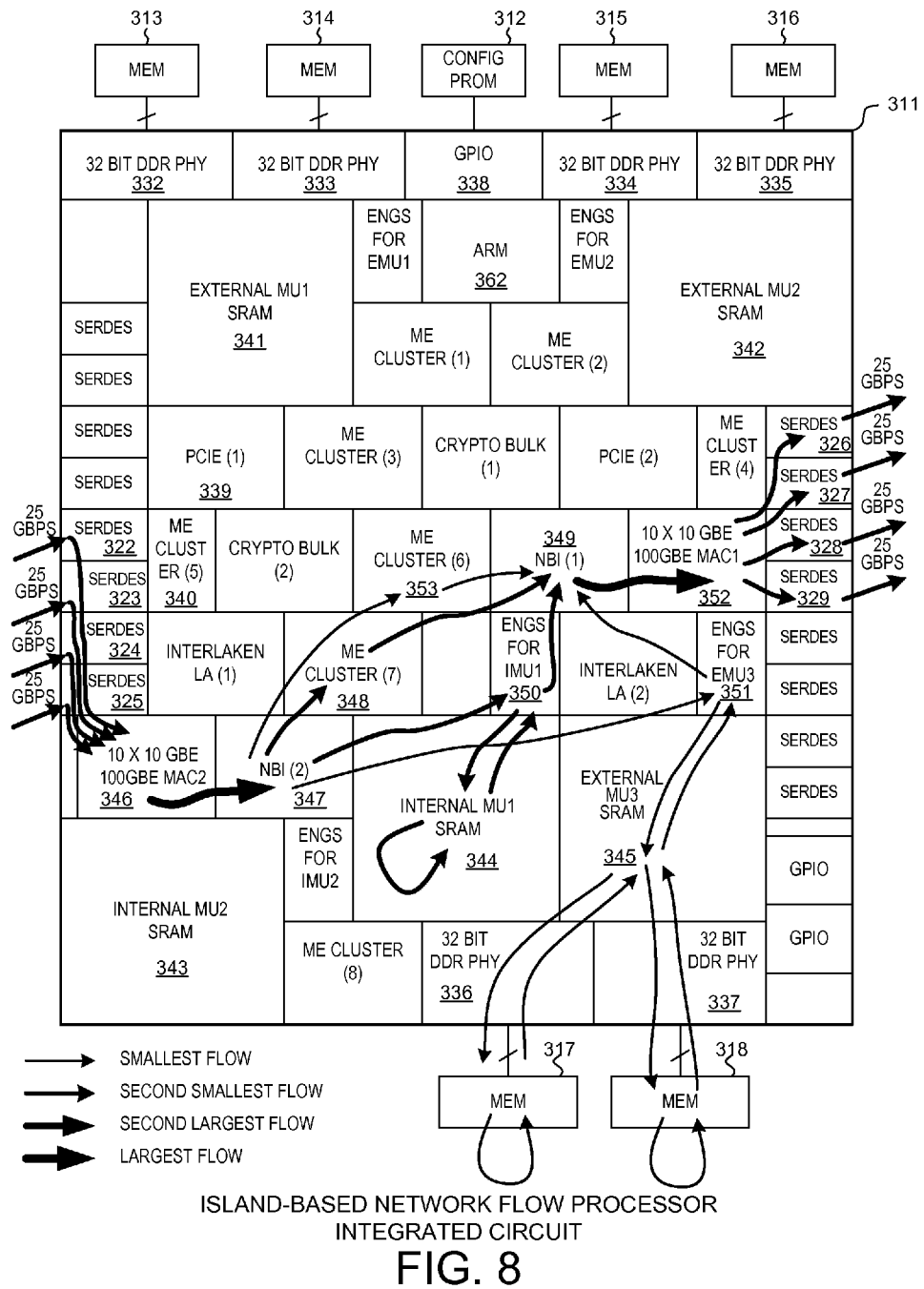
FIG. 8 is a more detailed top-down diagram of the IB-NFP integrated circuit of the network appliance of FIG. 7.

FIG. 8 is a more detailed top-down diagram of IB-NFP integrated circuit 311. SerDes circuits 322-325 are the first set of four SerDes circuits that are used to communicate with the external network via the optical cables 307 and 308. SerDes circuits 326-329 are the second set of four SerDes circuits that are used to communicate with the switch fabric 306. Each of these SerDes circuits is duplex in that it has a SerDes connection for receiving information and it also has a SerDes connection for transmitting information. Each of these SerDes circuits can communicate packet data in both directions simultaneously at a sustained rate of 25 Gbps. IB-NFP integrated circuit 311 accesses external memory integrated circuits 313-318 via corresponding 32-bit DDR physical interfaces 332-337, respectively. IB-NFP integrated circuit 311 also has several general purpose input/output (GPIO) interfaces. One of these GPIO interfaces 338 is used to access external configuration PROM 312.

In addition to the area of the input/output circuits outlined above, the IB-NFP integrated circuit 311 also includes two additional areas. The first additional area is a tiling area of islands. Each of the islands is either of a full rectangular shape, or is half the size of the full rectangular shape. For example, the island 339 labeled "PCIE (1)" is a full island. The island 340 below it labeled "ME CLUSTER (5)" is a half island. The functional circuits in the various islands of this tiling area are interconnected by: 1) a configurable mesh CPP data bus, 2) a configurable mesh control bus, and 3) a configurable mesh event bus. Each such mesh bus extends over the two-dimensional space of islands with a regular grid or "mesh" pattern. In addition to the tiling area, there is also a second additional area of larger sized blocks 341-345 of circuitry.

FIG. 8 illustrates, with arrows, an operational example of how data passes through the IB-NFP integrated circuit 311. 100 Gbps packet traffic is received via optical cable 307 (see FIG. 7), flows through optics transceiver 320, flows through PHY integrated circuit 319, and is received onto IB-NFP integrated circuit 311 spread across the four SerDes I/O blocks 322-325. The symbols pass through direct dedicated conductors from the SerDes blocks 322-325 to ingress MAC island 346. Ingress MAC island 346 converts successive symbols delivered by the physical coding layer into packets by mapping symbols to octets, by performing packet framing, and then by buffering the resulting packets for subsequent communication to other processing circuitry. The packets are communicated from ingress MAC island 346 across a private inter-island bus to ingress NBI (Network Bus Interface) island 347.

For each packet, the functional circuitry of ingress NBI island 347 examines fields in the header portion to determine what storage strategy to use to place the packet into memory. In one example, the NBI island 347 examines the header portion and from that determines whether the packet is an exception packet or whether the packet is a fast-path packet. If the packet is an exception packet then the NBI island 347 determines a first storage strategy to be used to store the packet so that relatively involved exception processing can be performed efficiently, whereas if the packet is a fast-path packet then the NBI island 347 determines a second storage strategy to be used to store the packet for more efficient transmission of the packet from the IB-NFP.

In the operational example of FIG. 8, NBI island 347 examines a packet header, performs packet preclassification, determines that the packet is a fast-path packet, and determines that the header portion of the packet should be placed into a CTM (Cluster Target Memory) in ME (MicroEngine) island 348. The header portion of the packet is therefore communicated across the configurable mesh data bus from NBI island 347 to ME island 348. The ME island 348 determines header modification and queuing strategy for the packet based on the packet flow (derived from packet header and contents) and the ME island 348 informs an egress NBI island 349 of these. In this simplified example being described, the payload portions of fast-path packets are placed into internal SRAM (Static Random Access Memory) MU block 344. The header portions of exception packets are placed into a CTM in ME island 353, and the payload portions of exception packets are placed into external DRAM 317 and 318.

Half island 350 is an interface island through which all information passing into, and out of, SRAM MU block 344 passes. The functional circuitry within half island 350 serves as the interface and control circuitry for the SRAM within block 344. Accordingly, the payload portion of the incoming fast-path packet is communicated from ingress NBI island 347, across the configurable mesh data bus to SRAM control island 350, and from control island 350, to the interface circuitry in block 344, and to the internal SRAM circuitry of block 344. The internal SRAM of block 344 stores the payloads so that they can be accessed for flow determination by the ME island.

In addition, a preclassifier in the ingress NBI island 347 determines that the header portions of exception packets are into a CTM in ME island 353, and the payload portions of exception packets should be stored in external DRAM 317 and 318. Interface island 351, block 345, and DDR PHY I/O blocks 336 and 337 serve as the interface and control for external DRAM integrated circuits 317 and 318. The payload portions of the exception packets are therefore communicated across the configurable mesh data bus from ingress NBI island 347, to interface and control island 351, to block 345, to 32-bit DDR PHY I/O blocks 336 and 337, and to external DRAM integrated circuits 317 and 318. At this point in the operational example, the packet header portions and their associated payload portions are stored in different places. The payload portions of fast-path packets are stored in internal SRAM in MU block 344, whereas the payload portions of exception packets are stored in external SRAM in external memories 317 and 318.

For fast-path packets, ME island 348 informs egress NBI island 349 where the packet headers and the packet payloads can be found and provides the egress NBI island 349 with an egress packet descriptor for each packet. The egress packet descriptor indicates a queuing strategy to be used on the packet. Egress NBI island 349 uses the egress packet descriptor to read the packet headers and any header modification from ME island 348 and to read the packet payloads from either internal SRAM 344 or external DRAMs 317 and 318. Similarly, for exception packets, ME island 353 informs NBI island 249 where the headers and packet payloads of exception packets are found.

Egress NBI island 349 places egress packet descriptors for packets to be output into the correct order. For each packet that is then scheduled to be transmitted, the egress NBI island 349 uses the egress packet descriptor to read the header portion, and an indication of any header modification to be performed, and the payload portion, and to assemble the packet to be transmitted. Note that indication of the header modification to be performed is not actually part of the egress packet descriptor, but rather it is a code stored with the packet header by the ME when the packet is presented to the egress NBI island 349. The egress NBI island 349 then performs any indicated packet modification on the packet. The resulting modified packet then passes from egress NBI island 349 and to egress MAC island 352.

Egress MAC island 352 buffers the packets, and converts them into symbols. The symbols are then delivered by conductors from egress MAC island 352 to the four SerDes I/O blocks 326-329. From SerDes I/O blocks 326-329, the 100 Gbps outgoing packet flow passes out of the IB-NFP integrated circuit 311 and across SerDes connections and to switch fabric 306. For additional details on IB-NFP 311, and on a network device that includes IB-NFP 311, see: U.S. patent application Ser. No. 13/399,324, by Gavin J. Stark, entitled "Configurable Mesh Data Bus In An Island-Based Network Flow Processor", filed Feb. 17, 2012 (the entire subject matter of which is incorporated herein by reference).

Figure 9:
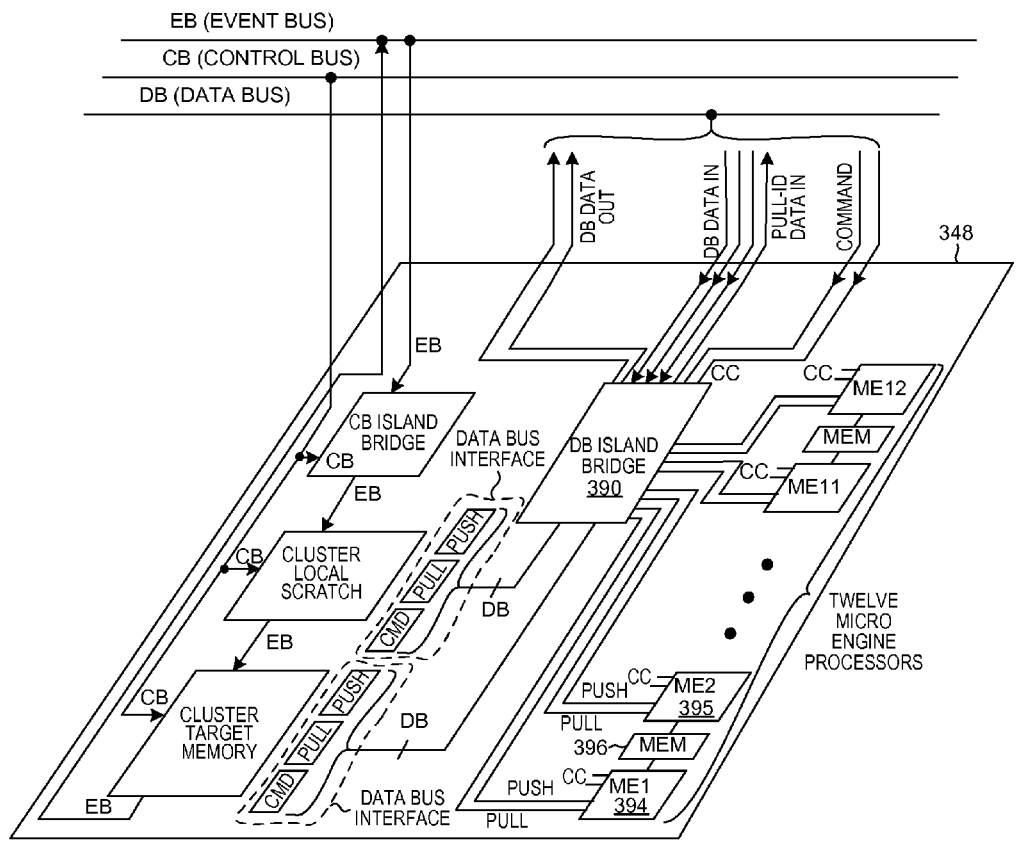
FIG. 9 is a diagram of an ME island of the IB-NFP integrated circuit of FIG. 8.

FIG. 9 is a more detailed diagram of the ME island 348. The microengines have, through the DB island bridge 390, a command out interface, a pull-id in interface, a pull-data out interface, and a push data in interface. There are six pairs of microengines, with each pair sharing a memory containing program code for the microengines. Reference numerals 394 and 395 identify the first pair of microengines and reference numeral 396 identifies the shared memory. One of the microengines is assigned to process the packet. As a result of this processing, the microengine modifies an ingress packet descriptor thereby generating an egress packet descriptor. Each egress packet descriptor includes: 1) an address indicating where and in which ME island the header portion is found, 2) an address indicating where and in which MU island the payload portion is found, 3) how long the packet is, 4) sequence number of the packet in the flow, 5) an indication of which queue the packet belongs to (result of the packet policy), 6) an indication of where the packet is to be sent (a result of the packet policy), 7) user metadata indicating what kind of packet it is.

A microengine within the ME island can use data bus commands to interact with a target, regardless of whether the target is located locally on the same ME island as the microengine or whether the target is located remotely in another island, using the same configurable data bus communications. If the target is local within the ME island, then the microengine uses data bus commands and operations as if the memory were outside the island in another island, except that bus transaction values do not have a final destination value. The bus transaction values do not leave the ME island and therefore do not need the final destination information. If, on the other hand, the target is not local within the ME island, then intelligence within the DB island bridge adds the final destination value before the bus transaction value is sent out onto the configurable mesh data bus. From the perspective of the microengine master, the interaction with the target has the same protocol and command and data format regardless of whether the target is local or remote.

Figure 10:
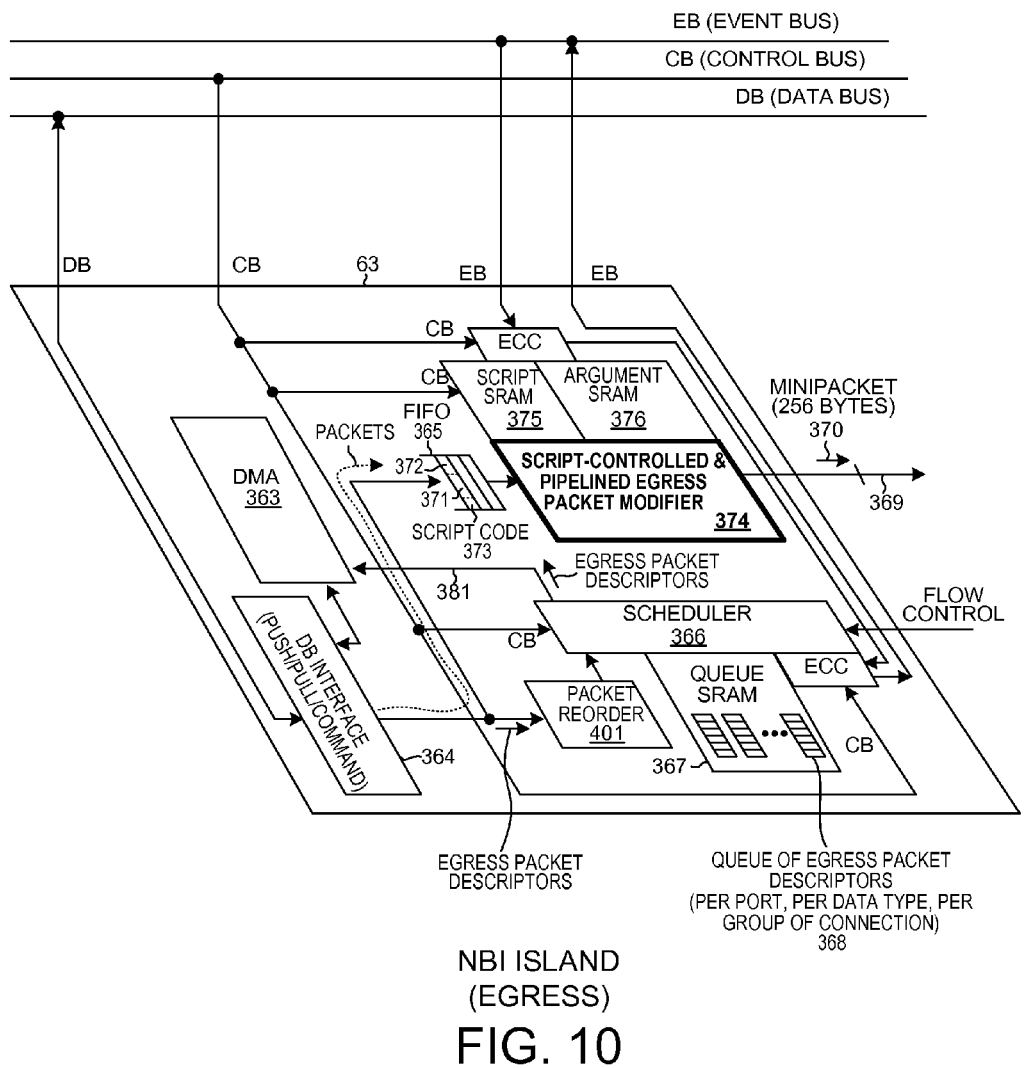
FIG. 10 is a diagram of an egress NBI island of the IB-NFP integrated circuit of FIG. 8.

FIG. 10 is a diagram of egress NBI island 63. In the operational example, ME island 66 instructs the egress NBI island 63 to transmit a packet by supplying the egress NBI island with an egress packet descriptor of the packet to be transmitted. The ME island supplies the egress packet descriptor to the egress NBI island by issuing a transmit packet command across the configurable mesh data bus and to the packet reorder block 401. The packet reorder block 401 responds by pulling the egress packet descriptor from the ME island across the CPP data bus. In this way, multiple egress packet descriptors enter packet reorder block 401. These egress packet descriptors are reordered so that the descriptors for the packets of a flow are in proper sequence. The scheduler 366 receives the properly ordered egress packet descriptors and pushes them onto appropriate queues in queue SRAM 367. Each such queue of egress packet descriptors is per port, per data type, per group of connections. Reference numeral 368 identifies one such queue. Packets of a connection in this case share the same set of source and destination IP addresses and TCP ports. Scheduler 366 schedules packets to be transmitted by popping egress packet descriptors off the queues in appropriate orders and at appropriate times, and by supplying the popped egress packet descriptors via conductors 381 to the DMA engine 363.

DMA engine 363 receives such an egress packet descriptor, and based on the information in the egress packet descriptor, transfers the payload portion and the header portion of the packet across CPP data bus and DB interface 364 and into FIFO 365. (FIFO 365 is also referred to here as the "packet supplying memory"). In the illustration of FIG. 10, each entry in FIFO 365 includes a complete packet having a script code portion 373, the header portion 371, and the payload portion 372. Information can be written into FIFO 365 as larger values, but information passes out of FIFO 365 and into the packet modifier 374 in ordered 32-byte chunks. The script code portion 373 at the beginning of the packet was added by the microengine in the ME island. As a result of the lookup performed at the direction of the microengine, a packet policy was determined, and part of this packet policy is an indication of what of the packet header to change and how to change it before the packet is transmitted. An example of such a modification is to change the MAC source and destination addresses, and to insert an extra MPLS header, at the decrement a TTL value, at the time the packet is output from the IB-NFP.

In a typical MPLS router, the MPLS labels of packets can remain the same as the packets flow into and through and out of the router. The MAC addresses of such a packet, however, should be changed on a hop by hop basis. The MAC hop on the ingress may be different from the MAC address on the egress. Accordingly, the packet exiting the MPLS router should have its source and destination MAC addresses changed to be appropriate for the next MAC hop into which the packet will be transmitted. The ME island supplies a script code portion for each packet for this purpose. The ME loads the script instruction SRAM 375 and argument SRAM 376 with appropriate values. The script code portion includes: 1) a direct/indirect bit, 2) a set of offsets, 2) a first address pointer into script instruction SRAM 375 indicating where a corresponding set of instructions is found, and 3) a second address pointer into argument SRAM 376 indicating where a corresponding set of arguments is found. The packet modifier 374 uses script code portion to retrieve the correct set of instructions, and the correct set of arguments. From the set of offsets, the set of instructions, and the set of arguments, a script parser in the packet modifier generates a corresponding set of opcodes.

An opcode includes: 1) an instruction indicating a modification to be performed, 2 an associated offset, 3) a value indicating a number of bytes to be modified, and 4) an associated argument to be used in carrying out the modification. In one example, a script defines eight opcodes, and there are four processing stages in the packet modification pipeline. An opcode may be a "NoOp" (no operation). An argument is a value to be used in a modification as indicated by the corresponding instruction. Examples of arguments retrieved include: 1) an Ethernet source address that is to replace the Ethernet source address of the packet, 2) a Ethernet destination address that is to replace the Ethernet destination address of the packet, and 3) an extra 4-byte MPLS label that is to be inserted into the packet.

Once the set of opcodes has been generated, the opcodes are supplied to the pipeline. A first of the opcodes can, for example, set up a pipeline stage to replace the Ethernet source address field value (starting at a first offset into the packet) with the Ethernet source address retrieved from argument SRAM 376, whereas a second of the opcodes can set up a pipeline stage to replace the Ethernet destination address field (starting at a second offset into the packet) with the Ethernet destination address retrieved from argument SRAM 376, whereas a third of the opcodes can set up a pipeline stage to insert a 4-byte MPLS header into the packet (starting at a third offset into the packet).

The packet modifier 374 receives a packet in 32-byte chunks from FIFO 365. As each 32-byte chunk passes through the packet modifier 374, it can increase in size due to the insertion of bits, or it can decrease in size due to the deleting of bits. The chunks pass through the pipeline in sequence, one after the other. The resulting modified chunks as they come out of the pipeline are aggregated at the end of the packet modifier into larger 256-byte portions of a packet, referred to here as minipackets. A minipacket includes a number of chunks, along with associated out-of-band control information. The out-of-band control information indicates how the data of the minipacket can be assembled with the data of other minipackets to reform the overall modified packet. In this way, the resulting modified packet is output from the egress NBI island 63 as a sequence of 256-byte minipackets across dedicated connections 369 to egress MAC island 64. Reference numeral 370 identifies one such minipacket.

Figure 11:
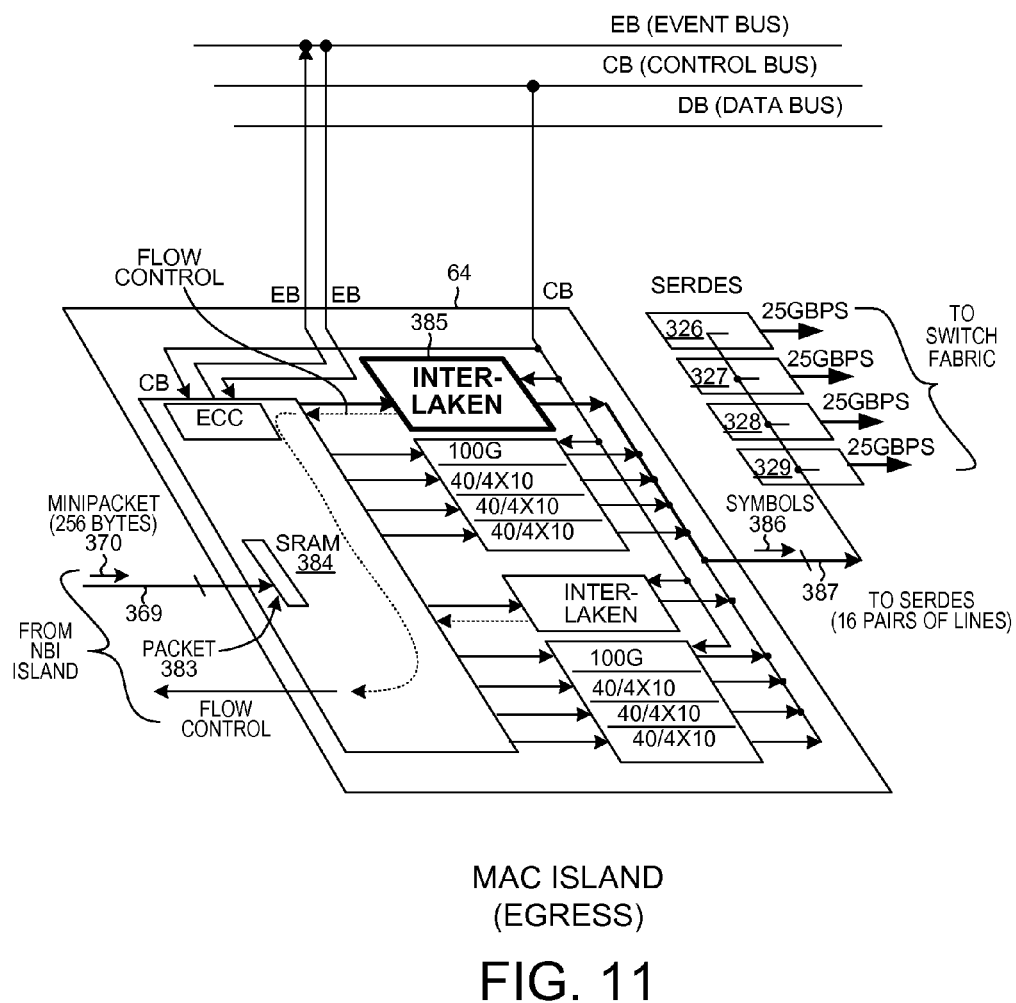
FIG. 11 is a diagram of an egress MAC island of the IB-NFP integrated circuit of FIG. 8.

FIG. 11 is a diagram of egress MAC island 64. A packet 383 for transmission is received from egress NBI island 63 in the form of 256-byte minipackets 370 via dedicated connections 369. Such packets are buffered in SRAM 384. In the operational example, the packets to be output from the egress MAC island via are converted into symbols by Interlaken block 385. The resulting symbols 386 pass via dedicated connections 387 to the four SerDes I/O blocks 25-28. As described above in connection with FIG. 1, the four SerDes I/O blocks are coupled by SerDes connections 29 to switch fabric 9 of the MPLS router 1.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. An egress packet modifier comprising: an input port through which the egress packet modifier receives a packet and a script code;
   an output port;
   a script parser that receives the script code and therefrom generates a first opcode and a second opcode, wherein the first opcode comprises: 1) a first instruction, 2) a first offset, 3) a first indication of an amount of data, and 4) a first argument, and wherein the second opcode comprises: 1) a second instruction, 2) a second offset, 3) a second indication of an amount of data, and 4) a second argument; and
   a pipeline comprising:
   a first processing stage that receives the first opcode from the script parser, wherein the first processing stage receives a first part of the packet and performs a first modification on the first part, wherein the first modification is determined by the first opcode; and
   a second processing stage that receives the second opcode from the script parser, wherein the second processing stage receives the first part of the packet from the first processing stage and performs a second modification on the first part, wherein the second modification is determined by the second opcode, wherein the first part of the packet as modified by the pipeline is output from the egress packet modifier via the output port.

2. The egress packet modifier of claim 1, wherein the script parser uses the script code to retrieve a first instruction and a second instruction from a memory, wherein the script parser includes the first instruction as part of the first opcode, and wherein the script parser includes the second instruction as part of the second opcode.

3. The egress packet modifier of claim 2, wherein a processor generates the script code, wherein the processor is not a part of the egress packet modifier, and wherein the processor causes the first and second instructions to be written into the memory.

4. The egress packet modifier of claim 1, wherein the script parser uses the script code to retrieve a first argument and a second argument from a memory, wherein the first processing stage uses the first argument to perform the first modification, and wherein the second processing stage uses the second argument to perform the second modification.

5. The egress packet modifier of claim 1, further comprising: an assembler circuit that receives the first part of the packet from the pipeline and that outputs the first part from the egress packet modifier from the output port as part of larger part of the packet.

6. The egress packet modifier of claim 1, wherein there are more than two processing stages in the pipeline.

7. The egress packet modifier of claim 1, wherein one of the first and second modifications is a modification that increases a number of bits of the first part.

8. The egress packet modifier of claim 1, wherein one of the first and second modifications is a modification that decreases a number of bits of the first part.

9. The egress packet modifier of claim 1, wherein the first part includes a number value, and wherein one of the first and second modifications is a modification that decrements the number value.

10. The egress packet modifier of claim 1, wherein the pipeline includes a plurality of processing stages, wherein the pipeline is adapted to process a packet in parts, wherein each part of the packet passes through each processing stage of the pipeline, and wherein the pipeline is adapted to perform multiple modifications simultaneously.

11. The egress packet modifier of claim 1, wherein none of the processing stages of the pipeline fetches an instruction from a memory, decodes the instruction, and executes the instruction.

12. The egress packet modifier of claim 1, wherein the packet is received via the input port one part at a time, wherein the parts of the packet are supplied to the pipeline sequentially one at a time, wherein multiple parts of the packet are processed by the pipeline simultaneously, and wherein the packet is output from the pipeline one part at a time.

13. The egress packet modifier of claim 1, wherein the egress packet modifier is a part of a network flow processor integrated circuit.

14. The egress packet modifier of claim 1, wherein the script code contains a pointer that indicates where a set of instructions is stored in a memory, wherein the set of instructions includes a first instruction and a second instruction, wherein the script parser includes the first instruction in the first opcode, and wherein the script parser includes the second instruction in the second opcode.

15. The egress packet modifier of claim 1, wherein the script code contains a pointer that indicates where a set of arguments is stored in a memory, wherein the set of instructions includes a first argument and a second argument, wherein the script parser includes the first argument in the first opcode, and wherein the script parser includes the second argument in the second opcode.

16. A method comprising: receiving a packet onto an egress packet modifier, wherein the packet is received as a sequence of parts;

receiving a script code onto the egress packet modifier;

using the script code to generate a plurality of opcodes, wherein the first opcode comprises: 1) a first instruction, 2) a first offset, 3) a first indication of an amount of data, and 4) a first argument, and wherein the second opcode comprises: 1) a second instruction, 2) a second offset, 3) a second indication of an amount of data, and 4) a second argument;

supplying the opcodes to a pipeline of processing stages thereby configuring the pipeline;

passing the sequence of parts of the packet through the pipeline of processing stages such that each processing stage can perform a selectable one of a plurality of modifications on each part of the packet, wherein the plurality of modifications includes a replace modification in which bits of a part of the packet are replaced with other bits, wherein the plurality of modifications includes an insert modification in which bits are inserted into a part of the packet, wherein none of the processing stages of the pipeline fetches instructions, decodes the instructions, and executes the instructions; and receiving the sequence of parts from the pipeline and outputting the packet from the egress packet modifier to an egress MAC (Media Access Control) processing circuit.

17. The method of claim 16, wherein the using of the script code to generate the plurality of opcodes involves using a first pointer to retrieve a set of instructions and involves using a second pointer to retrieve a set of arguments, wherein each opcode includes an instruction and an argument.

18. An egress packet modifier comprising: an input port through which the egress packet modifier receives a packet and a script code;

an output port; and means for using the script code to generate a plurality of opcodes, wherein the first opcode comprises: 1) a first instruction, 2) a first offset, 3) a first indication of an amount of data, and 4) a first argument, and wherein the second opcode comprises: 1) a second instruction, 2) a second offset, 3) a second indication of an amount of data, and 4) a second argument, for supplying the opcodes to a pipeline of processing stages, and for pipeline processing parts of the packet through the pipeline, wherein each processing stage performs a selectable one of a plurality of modifications as determined by a corresponding one of the opcodes, wherein the plurality of modifications includes a replace modification in which bits of a part of the packet are replaced with other bits, wherein the plurality of modifications includes an insert modification in which bits are inserted into a part of the packet, wherein none of the processing stages of the pipeline fetches instructions, decodes the instructions, and executes the instructions, and wherein the means is also for outputting the packet via the output port.

19. The egress packet modifier of claim 18, wherein the means is also for using the script code to retrieve a set of instructions, for using the script code to retrieve a set of arguments, and for generating the plurality of opcodes such that each opcode includes one of the instructions and one of the arguments.

* * * * *